United States Patent
Trovato et al.

(10) Patent No.: US 10,254,109 B2
(45) Date of Patent: Apr. 9, 2019

(54) SOUND CONTROLLER FOR OPTICAL SHAPE SENSOR

(71) Applicant: KONINKLIJKE PHILIPS N.V., Eindhoven (NL)

(72) Inventors: Karen Irene Trovato, Putnam Valley, NY (US); William J. Sgambati, Briarcliff Manor, NY (US); Molly Lara Flexman, Melrose, MA (US); Bharat Ramachandran, Morganville, NJ (US)

(73) Assignee: Koninklijke Philips N.V., Eindhoven (NL)

(*) Notice: Subject to any disclaimer, the term of this patent is extended or adjusted under 35 U.S.C. 154(b) by 349 days.

(21) Appl. No.: 15/023,062

(22) PCT Filed: Sep. 19, 2014

(86) PCT No.: PCT/IB2014/064653
§ 371 (c)(1),
(2) Date: Mar. 18, 2016

(87) PCT Pub. No.: WO2015/044843
PCT Pub. Date: Apr. 2, 2015

(65) Prior Publication Data
US 2016/0202044 A1  Jul. 14, 2016

Related U.S. Application Data

(60) Provisional application No. 61/884,190, filed on Sep. 30, 2013.

(51) Int. Cl.
*G01B 11/16* (2006.01)
*G08B 3/10* (2006.01)
*G01H 17/00* (2006.01)

(52) U.S. Cl.
CPC ............ *G01B 11/18* (2013.01); *G01H 17/00* (2013.01); *G08B 3/10* (2013.01)

(58) Field of Classification Search
CPC .......... G01B 11/18; G01B 11/16; G08B 3/10; G01H 17/00
USPC .................................................. 73/655, 587
See application file for complete search history.

(56) References Cited

U.S. PATENT DOCUMENTS

| | | | | |
|---|---|---|---|---|
| 5,160,972 A | * | 11/1992 | Walters | G01L 5/047 254/134.4 |
| 5,270,537 A | * | 12/1993 | Jacobs | G01M 11/31 250/227.15 |
| 5,729,335 A | * | 3/1998 | Green | G01L 5/047 250/227.16 |
| 2014/0211213 A1 | | 7/2014 | Weiss | |

FOREIGN PATENT DOCUMENTS

GB  2465790 A  6/2010

* cited by examiner

Primary Examiner — Justin Seo
Assistant Examiner — Rose M Miller (57) ABSTRACT

An OSS sound generation system employing an optical shape sensor (10), an optical shape sensor (10) controller, one or more audible devices (40) and a sound controller (30). In operation, the OSS controller (20) controls a generation by the optical shape sensor (10) of sensor data indicative of stimuli measurement(s) of the optical shape sensor (10), and the sound controller (30) interprets the sensor data to control a generation by the audible device(s) (40) of one or more sound(s) derived from the stimuli measurement(s) of the optical shape sensor (10).

15 Claims, 4 Drawing Sheets

SOUND CONTROLLER FOR OPTICAL SHAPE SENSOR

CROSS-REFERENCE TO PRIOR APPLICATIONS

This application is the U.S. National Phase application under 35 U.S.C. § 371 of International Application No. PCT/IB2014/064653, filed on Sep. 19, 2014, which claims the benefit of U.S. Provisional Application No. 61/884,190, filed on Sep. 30, 2013. These applications are hereby incorporated by reference herein.

The present invention generally relates to optical shape sensors of any type. The present invention specifically relates to audible indications derived from stimuli measurements of an optical shape sensor (e.g., strain, temperature, etc.)

Optical shape sensing ("OSS") based on fiber optics exploits the inherent backscatter in a conventional optical fiber. The principle involved makes use of distributed stimuli measurement in the optical fiber using characteristic Rayleigh backscatter patterns or by employing fiber Bragg gratings ("FBGs").

A physical length and index of refraction of a fiber are intrinsically sensitive to environmental parameters, temperature and strain and, to a much lesser extent, pressure, humidity, electromagnetic fields, chemical exposure, etc. The wavelength shift, $\Delta\lambda$ or frequency shift, $\Delta v$, of the backscatter pattern due to a temperature change, $\Delta T$, or strain along the fiber axis, $\varepsilon$ is: $\Delta\lambda/\lambda = -\Delta v/v = K_T \Delta T + K_\varepsilon \varepsilon$, where $$K_\varepsilon = 1 - n_{eff}^2/2(p_{12} - v(p_{11} + p_{12}))$$

The temperature coefficient $K_T$ is a sum of the thermal expansion coefficient, $\alpha = (1/\Lambda)(\partial\Lambda/\partial T)$, and the thermo-optic coefficient, $\xi = (1/n)(\partial n/\partial T)$, with a typical value of $0.55 \times 10^{-6}$ C.$^{-1}$ and a value of $6.1 \times 10^{-6}$ C.$^{-1}$ for germanium-doped silica core fibers. The strain coefficient $K_\varepsilon$ is a function of group index n, the components of the strain-optic tensor, $p_{ij}$ and Poisson's ratio, $\mu$. Typical values given for n, $p_{12}$, $p_{11}$ and $\mu$ for germanium-doped silica yield a value for $K_\varepsilon$ of about 0.787. Thus, a shift in temperature or strain is merely a linear scaling (for moderate temperature and strain ranges) of the spectral frequency shift $\Delta v$. Naturally, this linear model would not apply if strains approach the elastic limit of the fiber, or temperatures approach the glass transition temperature of the fiber.

An optical fiber as known in the art is minimally intrusive, virtually weightless, and capable of providing real-time feedback of its dynamic shape and position. When embedded or surface-attached to a surgical tool or other device, the optical fiber may be used to monitor a dynamic shape and position of the surgical tool or other device independent of the temperature or load environment.

One form of optical fiber known in the art incorporates Fiber Bragg Grating ("FBG") sensors that are positioned along the optical fiber (e.g., 10,000 FBG sensors with one (1) cm or less spacing between each sensor). The FBG sensors are operated in accordance with Optical Frequency Domain Reflectometry ("OFDR"), which is a demodulation technique that permits tens of thousands of FBG sensors with the same nominal reflected wavelength to be read with very high spatial resolution.

More particularly, a FBG stimuli sensor is a short segment of the optical fiber that reflects particular wavelengths of light and transmits all others. This is achieved by adding a periodic variation of the refractive index in the fiber core, which generates a wavelength-specific dielectric mirror. A FBG stimuli sensor can therefore be used as an inline optical filter to block certain wavelengths, or as a wavelength-specific reflector.

The fundamental principle behind the operation of a FBG stimuli sensor is Fresnel reflection at each of the interfaces whereby the refractive index is changing. One of the main advantages of this technique is that FBG sensors may be distributed over the length of the optical fiber. Incorporating three (3) or more cores with various FBG sensors along the length of the optical fiber allows for a three dimensional ("3D") form of such a structure to be precisely determined.

As an alternative to FBG sensors, an inherent backscatter in conventional optical fiber may be exploited. One such approach is to use Rayleigh scatter in standard single-mode communications fiber. Rayleigh scatter occurs as a result of random fluctuations of the index of refraction in the fiber core. These random fluctuations can be modeled as a FBG stimuli sensor with a random variation of amplitude and phase along the grating length. By using this effect in three (3) or more cores running within a single length of a multicore fiber, the multi-core fiber serves as an optical shape sensor for tracking the 3D shape and dynamics of a surface of interest.

The optical fiber can therefore contain thousands of position points along the fiber, and often over 500 Hz, which is far faster and with higher resolution than an electronic monitor can display.

In operation, there is so much data coming from an optical shape sensor that it is difficult to visually comprehend all of the changes that are occurring simultaneously. In general, the present invention is premised on a generation of sounds mapped to stimuli measurement(s) of the optical shape sensor whereby a user of the optical shape sensor may understand changes in operational property(ies) of the optical shape sensor without relying on a visual interpretation of complex, dynamic, 3D views of the optical shape sensor.

One form of the present invention is a OSS sound generation system employing an optical shape sensor (e.g., a multicore fiber having FBG sensors or utilizing Raleigh scattering), an optical shape sensor controller, an audible device (e.g., a speaker, an instrument or a synthesizer), and a sound controller. In operation, the OSS controller controls a generation by the optical shape sensor of sensor data indicative of stimuli measurements of the optical shape sensor, and the sound controller interprets the sensor data to control a generation by the audible device of one or more sound(s) derived from the stimuli measurements of the optical shape sensor. Stimuli measurements of the optical shape sensor as known in the art represent mechanical force(s) and thermal energy, etc. (i.e., external influences) being exerted on portion(s) of or the entire optical shape sensor.

The sound(s) may be audible indications of various effects, impacts or changes of the operational properties of the optical shape sensor resulting from the external influence(s) being exerted on the optical shape sensor. For purposes of the present invention, the term "operational properties" are broadly defined as any quality, feature, parameter, aspect, component or otherwise property of the optical shape sensor to any degree pertinent to, related to or resulting from a designed operation of the optical shape sensor (e.g., an embedding or surface attachment of the optical shape sensor to a surgical tool or other device for dynamic tracking purposes). Examples of the operational properties include, but are not limited to, an overall shape of the optical shape sensor, a curvature of a segment or an entirety of the optical shape sensor, a tension of a segment or an entirety of the optical shape sensor, a vibration of a segment or an entirety of the optical shape sensor, a twist of a segment or an entirety of the optical shape sensor, or a temperature of a segment or an entirety of the optical shape sensor.

By further example, the sound(s) may be audible indications of a fixed or changing location and/or direction (e.g., left, right, up, down, etc.) of the optical shape sensor resulting from the external influence(s) being exerted on the optical shape sensor, particularly relative to a registered coordinate system associated with the optical shape sensor, a geographical area enclosing the optical shape sensor and/or an object (e.g., anatomical) adjacent or abutting the optical shape sensor.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

As previously stated herein OSS sound generation system of the present invention employs an optical shape sensor, an OSS controller, one or more audible device(s) and a sound controller.

In practice, the optical shape sensor may be a single core fiber or a multicore fiber structurally configured as known in the art to generate sensor data indicative of stimuli measurement of the optical shape sensor. In one embodiment, the optical shape sensor is a multicore fiber incorporating FBG sensors as known in the art. In a second embodiment, the optical shape sensor is a multicore fiber utilizing a Raleigh scattering within the cores as known in the art.

In practice, the OSS controller is any combination of hardware, software, firmware and/or circuitry structurally configured as known in the art to control a generation of the sensor data by the optical shape sensor. In one embodiment, the OSS controller implements a OFDR demodulation technique to control a generation of the sensor data by the optical shape sensor.

In practice, the audible device is any device known in the art for generating sound(s) including, but not limited to, a speaker, an instrument and a synthesizer.

In practice, the sound controller is any combination of hardware, software firmware and/or circuitry structurally configured to control a generation of sound(s) by the audible device(s) as derived from the sensor data. In one embodiment, the sound controller employs a OSS interpreter structurally configured in accordance with the present invention to interpret the sensor data generated by the optical shape sensor, and a note generator structurally configured to generate and communicate note(s) to the audible device(s) in accordance with the present invention based on the interpretation of the sensor data.

FIGS. 1-8 will now be described herein to facilitate an understanding of an OSS sound generation system of the present invention.

Figure 1:
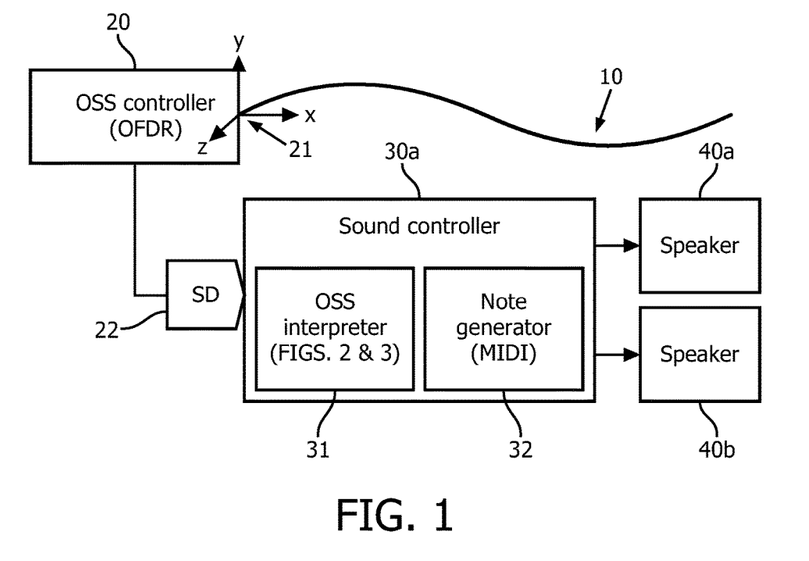
FIG. 1 illustrates a first exemplary embodiment of an OSS sound generation system in accordance with the present invention.

Referring to FIG. 1, an OSS sound generation system employs an optical shape sensor 10, an OSS controller 20, a sound controller 30a, and speakers 40a and 40b.

In one embodiment, OSS sensor 10 is a fiber optic based on FBG sensors. As previously discussed herein, an FBG sensor is a short segment of optical fiber that reflects particular wavelengths of light and transmits all others. This is achieved by adding a periodic variation of the refractive index in the fiber core, which generates a wavelength-specific dielectric mirror. A FBG sensor can therefore be used as an inline optical filter to block certain wavelengths, or as a wavelength-specific reflector.

A fundamental principle behind the operation of FBG sensors is Fresnel reflection at each of the interfaces where the refractive index is changing. For some wavelengths, the reflected light of the various periods is in phase so that constructive interference exists for reflection and, consequently, destructive interference for transmission. The Bragg wavelength is sensitive to strain as well as to temperature. This means that Bragg gratings can be used as sensing elements in fiber optical sensors. In an FBG sensor, the measurand (e.g., strain or temperature) causes a shift in the Bragg wavelength.

One advantage of this technique is that various sensor elements can be distributed over the length of a fiber. Incorporating three or more cores with various sensors (gauges) along the length of a fiber that is embedded in a structure permits a 3D form of such a structure to be precisely determined, typically with better than 1 mm accuracy. Along the length of the fiber, at various positions, a multitude of FBG sensors can be located (e.g. 3 or more fiber sensing cores). From the stimuli measurement of each FBG, the curvature of the structure can be inferred at that position. From the multitude of measured positions, the total 3D form is determined.

As an alternative to fiber-optic Bragg gratings, the inherent backscatter in conventional optical fiber can be exploited. One such approach is to use Rayleigh scatter in standard single-mode communications fiber. Rayleigh scatter occurs as a result of random fluctuations of the index of refraction in the fiber core. These random fluctuations can be modeled as a Bragg grating with a random variation of amplitude and phase along the grating length. By using this effect in three or more cores running within a single length of multi-core fiber, the 3D shape and dynamics of the surface of interest can be followed.

In operation, OSS controller 20 controls a generation of sensor data 22 by optical shape sensor 10 that is indicative of stimuli measurements of optical shape sensor 10. Sensor data 22 is generated relative to a reference coordinate system 21 established by OSS controller 22 and is communicated to sound controller 30a in a data stream of coordinate points associated with the sensors of optical shape sensor 10.

OSS interpreter 31 interprets sensor data 22 to ascertain the implications of the external influence(s) being applied to optical shape sensor 10.

Figure 2:
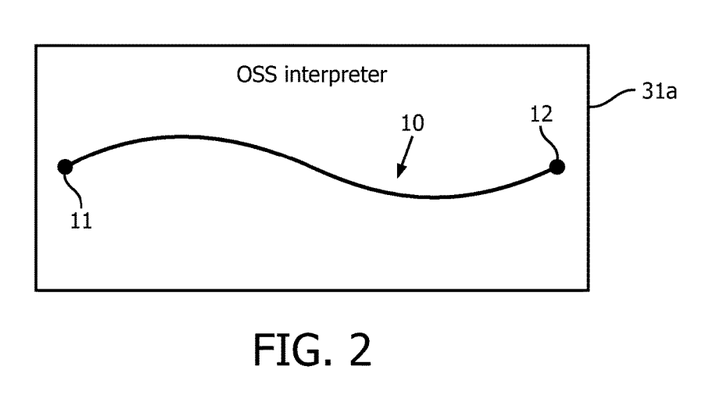
FIG. 2 illustrates a first exemplary embodiment of an OSS interpreter in accordance with the present invention.

In one embodiment 31a of OSS interpreter 31 as shown in FIG. 2, the data stream includes coordinate points of the sensors of optical shape sensor 10 extending from a proximal end 11 of optical shape sensor 10 to a distal end 12 of optical shape sensor 10 and OSS interpreter 31a processes the data stream to calculate various operational properties of optical shape sensor 10 including, but not limited to, an overall shape, an accumulated twist, a vibration, a torque and/or a stress of optical shape sensor 10. For OSS interpreter 31a, a note generator 32 (FIG. 1) of sound controller 30a compares the calculated properties to a warning threshold and/or an operating profile (e.g., a desired shape, curvature, temperature, etc.) and incorporates a Musical Instrument Digital Interface ("MIDI") as known in the art to generate note(s) indicative of the operational property(ies) approaching and/or exceeding the warning threshold, and/or of the operational property(ies) a matching or mismatching of the operating profile.

Additionally, note generator 32 may increase the volume of the note(s) and/or generate the note(s) in an obnoxious manner the closer the approach to the warning thresholds and/or the longer the warning threshold(s) are exceeded, or longer the operating profile is matched or mismatched. Furthermore, a sound frequency of a note may correspond to a location along optical shape sensor 10 associated with the warning threshold being exceeded. For example, deeper sounds may be associated with proximal end 11 of optical shape sensor 10 and higher sounds may be associated with distal end 12 of optical shape sensor 10.

Figure 3:
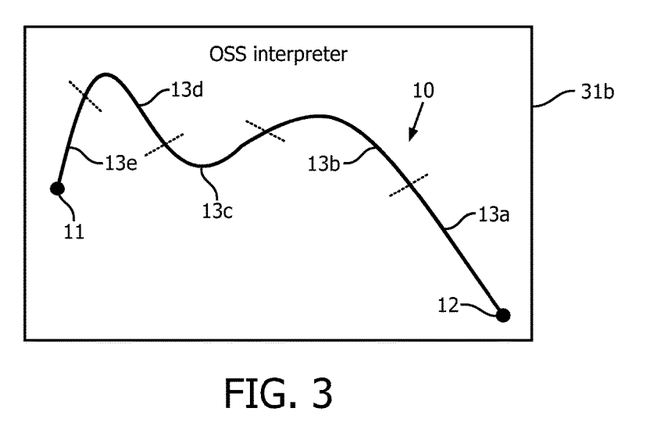
FIG. 3 illustrates a second exemplary embodiment of an OSS interpreter in accordance with the present invention.

In a second embodiment of 31b of OSS interpreter 31 as shown in FIG. 3, OSS interpreter 31b views optical shape sensor 10 as segments and receives and/or interprets coordinate points within the data stream of sensor data 22 corresponding to the beginning and end points of each segment.

For example, optical shape sensor 10 is ½ meter long (500 mm) and divided into five (5) 100 mm (4 inch) segments 13 as shown in FIG. 3. A fundamental curvature of each segment 13 (a-e) is computed by OSS interpreter 31b based on a location of coordinate points at each end and the middle of a particular segment 13. For the computation as shown below, each segment has the proximal 3-D location P, the distal 3D location D, and a 3D midsection M. Further, there is a 'midpoint', which is defined as the location half-way between the 3D locations of P and D.

$W$=EuclideanDistBetween($P.x,P.y,P.z,D.x,D.y,D.z$);// straight line distance midpointX=(P.x+D.x)/2;

midpointY=(P.y+D.y)/2;

midpointZ=(P.z+D.z)/2;

$H$=EuclideanDistBetween($M.x,M.y,M.z$,midpointX, midpointY,midpointZ);

radius=$H$/2+pow($W$,2)/(8*$H$);

curvature=1/radius;//if radius is near zero,assign curvature to a big number

Where
EuclideanDistBetween(double X1, double Y1, double Z1, double X2, double Y2, double Z2)

```
{
    return( sqrt(pow(X2-X1,2) + pow(Y2-Y1,2) + pow(Z2-Z1,2)));
}
```

The above description is a simplified example. Curvature may alternatively be computed all along optical shape sensor 10 at much finer intervals (e.g., every 40 microns (0.04 mm) along the shape). This 'instantaneous curvature' called Kappa may be calculated along fiber of sensor 10 (z_vec) at very small intervals (z_step) between every location (i) and the preceding location (i−1).

For curvature, the Kappa may be computed from shape of sensor 10 as follows:

$dx$=(z_vec($i$,1)−z_vec($i$−1,1))/z_step;

$dy$=(z_vec($i$,2)−z_vec($i$−1,2))/z_step;

$dz$=(z_vec($i$,3)−z_vec($i$−1,3))/z_step;

sum=$dx*dx+dy*dy+dz*dz$;

sum=sqrt(sum);

$f$Kappa($i$)=sum;

At a more fundamental level, the curvature may be computed from the phase/stimuli measurement as known in the art.

Referring back to FIG. 3, for each of the five (5) segments 13, the following map may be used for the computed curvatures.

| Segment | Note | Curvature |
| --- | --- | --- |
| 13a | E | 0.5 |
| 13b | G | 4 |
| 13c | B | 4 |
| 13d | D | 5 |
| 13e | F | 3 |

From the map, each segment 13 corresponds to a particular note in increasing order.

In one curvature embodiment, note generator 32 may generate note(s) corresponding to the segment 13 matching the highest curvature (e.g., segment 13d) and the volume of the note may be varied in dependence of the degree of curvature (e.g., louder notes for higher curvatures). This is particularly relevant in interventional devices where it is essential to identify when a device has flipped back on itself during navigation.

In a second curvature embodiment, note generator 32 may generate note(s) corresponding to every segment 13, but use the curvature to define the volume of each note (e.g., segments 13b-13d would have a higher volume of sound than segments 13a and 13e).

In a third curvature embodiment, note generator 32 may generate note(s) corresponding to the segment 13 using relative twist along optical shape sensor 10. In this case, the measure of twist may define the volume and the range of twist may be limited to the range of twist permitted for optical shape sensor 10 whereby an increasing volume of the note(s) indicate(s) approaching limit of twist.

In a fourth curvature embodiment, note generator 32 may generate a specific note at a specific volume corresponding to a cumulative twist for the entire length of a segment 13.

Also, the distal segment 13a of optical shape sensor 10 may generate a sound in real time as distal segment 13a is moved and/or changes orientation. For example, OSS interpreter 31b monitors distal segment 13 and based on the monitoring, note generator 32 generates a musical note indicating a tip direction of optical shape sensor 10 whereby each direction has a different note (e.g., UP, Down, Left, Right, Forward, Back) can each have a distinct sound.

In a preferred embodiment, high (pitch) notes denote UP, low (pitch) notes for Down. The balance of volume may indicate the location (Left to Right). So volume intensity in decibels to each speaker (L,R) could be:

Left: 100% L, 0% R  Center: 50% L, 50% R  Right: 0% L, 100% R

Current Midi modules drive two speakers.

We can enable the third dimension (virtual point) to be conveyed to the user by using a second Midi module, M2, dividing up the total decibels over 4 speakers, while using pitch to indicate height.

For example 3D can be provided for a patient table, or mounted to an imaging device for example. A first midi (M1) drives the L,R speaker 40 pair at the head end of a patient table, and the second midi (M2) drives the L,R speaker 40 pair at the foot end. Placing speakers on four parts of a patient table, having a head end and a foot end for example, the total decibels would be distributed as follows:

| Left Head | | Center Head | Right Head |
|---|---|---|---|
| M1: | | M1: 50% L, 50% R | M1: |
| 100% L, 0% R | | M2: 0% L, 0% R | 0% L, 100% R |
| M2: | | | M2: |
| 0% L, 0% R | | | 0% L, 0% R |
| Left Waist | | Center Waist | Right Waist |
| M1: | | M1: 25% L, 25% R | M1: |
| 50% L, 0% R | | M2: 25% L, 25% R | 0% L, 50% R |
| M2: | | | M2: |
| 50% L, 0% R | | | 0% L, 50% R |
| Left Knee | Slight-Left knee | Center knee | |
| M1: | M1: 18.75% L, 6.2% R | M1: 12.5% L 12.5% R | |
| 25% L, 0% R | M2: 56.25% L, 18.75% R | M2: 37.5% L, 37.5% R | |
| M2: | | | |
| 75% L, 0% R | | | |
| Left Foot | | Right Waist | Right Foot |
| M1: | | M1: 0% L, 0% R | M1: |
| 0% L, 0% R | | M2: 50% L, 50% R | 0% L, 0% R |
| M2: | | | M2: |
| 100% L, 0% R | | | 0% L, 100% R |

Some of the most critical clinical steps occur with subtle, small motions. In order to capture this with sound, the movement should be first magnified, particularly if the focus is the change in motion or direction. For example, a catheter may have stopped as it travels alongside the heart, but will experience motion due to the adjacent beating heart. Each heartbeat takes about 370 ms, followed by a rest of about 600 ms.

In this case, the distal 10 mm of the OSS fiber (tip) can form a vector in 3D. The change in vector location can be multiplied by 1000 before sending the signals to the sound system. This would give the perception of standing at the tip of the fiber, and enable the physician to 'hear the heartbeat'.

In summary, two note generators 32 may generate a surround sound through four speakers 40 indicated by a tip direction of segment 13a whereby sound from different directions correspond to tip direction. Basically, a 'virtual point' is created by coordinating sound from speakers 40. Similarly, "five point one" surround sound could be envisioned as an alternative system.

In a vibration embodiment, OSS interpreter 31a or OSS interpreter 31b may determine vibration of segment(s) and/or entirety of optical shape sensor 10 by the number of corrupted shape measurements of such segment(s) or overall shape of optical shape sensor 10. Specifically, a segment shape or overall shape of optical shape sensor 10 is considered corrupted when a vibration occurs during a stimuli sensor measurement. This typically occurs with measurement frequencies higher than 1 kHz, which is expected when optical shape sensor is in friction contact with an object. Corrupted shape measurements (and by association high-frequency vibration) may be detected, such as, for example, by looking for discontinuities in the twist along optical shape sensor 10. More particularly, a detection of a distal tip vibration involves identifying a loss of shape and twist discontinuities near the distal tip of optical shape sensor 10.

In a temperature embodiment, OSS interpreter 31a or OSS interpreter 31b may measure temperature as axial strain in a central core of optical shape sensor 10. Specifically, since a central core is in the center of optical shape sensor 10, the central core doesn't experience any length change due to bending of optical shape sensor 10. The central core only experiences length change due to axial strain, which may be due to tension and temperature. Tension can change during navigation (e.g., pulling on optical shape sensor 10). However, once optical shape sensor 10 is positioned in a desired location of coordinate system 21, optical shape sensor 10 may no longer experience a dynamically changing tension. Consequently, axial strain may be used for temperature measurement, which is beneficial for ablation monitoring and any other temperature related procedures.

Figure 4:
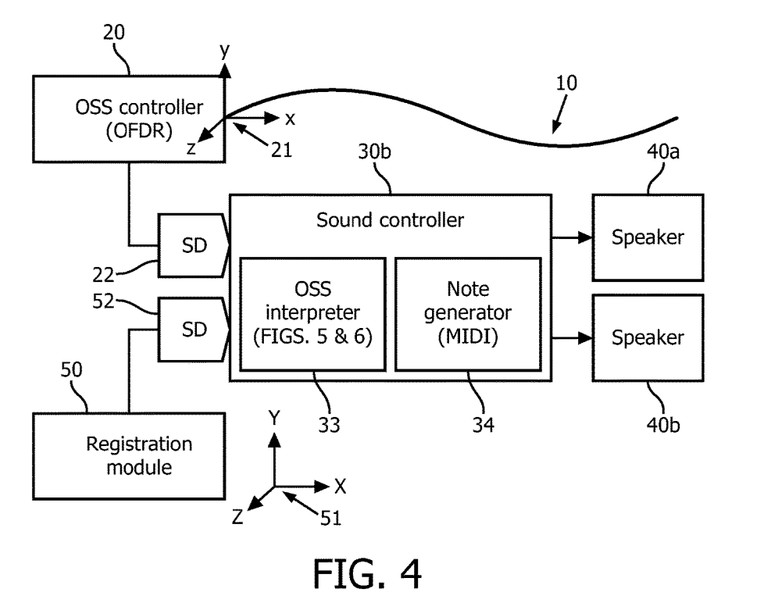
FIG. 4 illustrates a second exemplary embodiment of an OSS sound generation system in accordance with the present invention.

Referring to FIG. 4, an OSS sound generation system of the present invention employs optical shape sensor 10, OSS controller 20, a sound controller 30b, speakers 40a and 40b and a registration module 50. In practice, registration module 50 is any combination of hardware, software, firmware and/or circuitry structurally configured as known in the art to generate registration data 52 based on a registration of reference coordinate system 21 to a coordinate system 51. Examples of registration data 52 include, but are not limited to, a rotational matrix associated with a registration of coordinate systems 21 and 51, and a boundary of an area or object relative to coordinate system 51.

In one embodiment, registration module 50 communicates registration data 52 to sound controller 30b whereby a OSS interpreter 33 interprets sensor data 22 and registration data 52 to determine if optical shape sensor 30 is contacting or penetrating a boundary of the area or object relative to coordinate system 51 and note generator 34 generates a musical note if it is determined that optical shape sensor 30 is contacting or penetrating a boundary of the area or the object.

Figure 5:
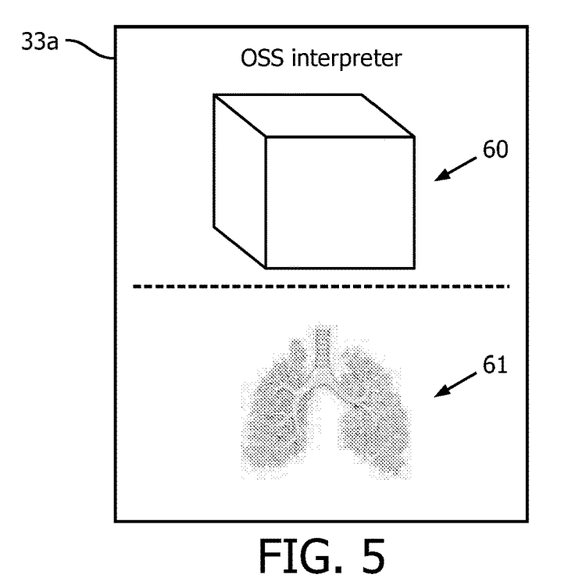
FIG. 5 illustrates a third exemplary embodiment of an OSS interpreter in accordance with the present invention.

For example, as shown in FIG. 5, an OSS interpreter 33a receives registration data 52 indicative of a geometrical area 60 or an anatomical object 61. Registration of coordinate systems 21 and 51 is performed by registration module 50 or a rotational matrix associated with a registration of coordinate systems 21 and 51 is provided to registration module 50. From such registration, OSS interpreter 33a will be able to determine when any coordinates points of sensor data 22 and registration data 52 indicate optical shape sensor 30 is contacting or penetrating a boundary of the geometrical area 60 or anatomical object 61.

Alternatively, registration data 52 indicates a registration of an area or an object with reference coordinate system 21 whereby a OSS interpreter 33 interprets sensor data 22 and registration data 52 to determine if optical shape sensor 30 is contacting or penetrating a boundary of the area or object relative to coordinate system 21 and note generator 34 generates a musical note if it is determined that optical shape sensor 30 is contacting or penetrating a boundary of the area or the object.

In another embodiment, registration module 50 communicates registration data 52 to sound controller 30b whereby OSS interpreter 33 interprets sensor data 22 and registration data 52 to determine if a distal tip of optical shape sensor is contacting (e.g., bumping, scraping, popping) a boundary of an area or object relative to coordinate system 51 and any change in direction due to the contact. In response thereto, note generator 34 generates a musical note if it is determined that the tip direction has changed due to optical shape sensor 30 contacting a boundary of the area or the object.

Figure 6:
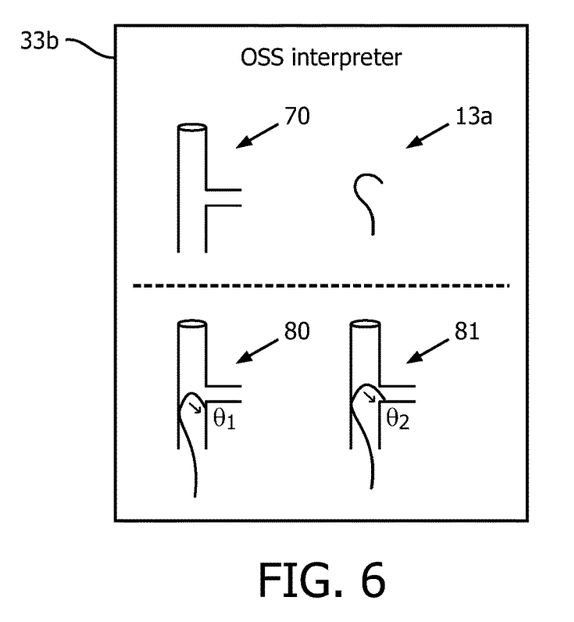
FIG. 6 illustrates a fourth exemplary embodiment of an OSS interpreter in accordance with the present invention.

For example, as shown in FIG. 6, a vessel 70 may have a lumen heading off to the right. Accordingly, a distal segment 13a will be compressed as distal segment 13a slides up a wall of vessel 70 at tip angle $\theta_1$ (theta.sub.one) as exemplary shown by pose 80. For this compression, note generator 34 may generate a metal-squeeking noise. Some slight variations in tip angle $\theta_1$ (theta.sub.one) could be expected as it pushes up the wall of vessel 70. As such, note generator 34 may potentially including obnoxious scratching noise as a function of the slight angle changes. Once the lumen is reached as exemplary shown by pose 81, a sudden discontinuity will occur as the spring tension pops distal tip 13a into the lumen at a tip angle $\theta_2$ (theta.sub.two). It will be fairly subtle and not be felt at the proximal region, however note generator 32 may make a use aware with a 'pop' sound. To ensure that the pop is correct, note generator 32 will ensure angle tip angle $\theta_2$ (theta.sub.two) is stabilized. Pushing forward then would mean the distal tip 13a is in the lumen. An image could be acquired to verify that it is the correct vessel. This example is beneficial to applications where an optical shape sensor is attached or embedded in a surgical tool, particularly a catheter having a floppy distal end.

Alternatively, registration data 52 indicates a registration of an area or an object with reference coordinate system 21 whereby OSS interpreter 33 interprets sensor data 22 and registration data 52 to determine if a distal tip of optical shape sensor is contacting (e.g., bumping, scraping, popping) a boundary of an area or object relative to coordinate system 21 and any change in direction due to the contact. In response thereto, note generator 34 generates a musical note if it is determined that the tip direction has changed due to optical shape sensor 30 contacting a boundary of the area or the object.

Additionally, OSS interpreter 33 may employ know techniques to determine if there is 'loss of registration' between coordinate systems 21 and 51, or between coordinate system 21 and an area or object. For example, if an identified entry point into the area or the body moves by more than a distance threshold (e.g., X cm), then OSS interpreter may ascertain that the registration has been lost.

Figure 7:
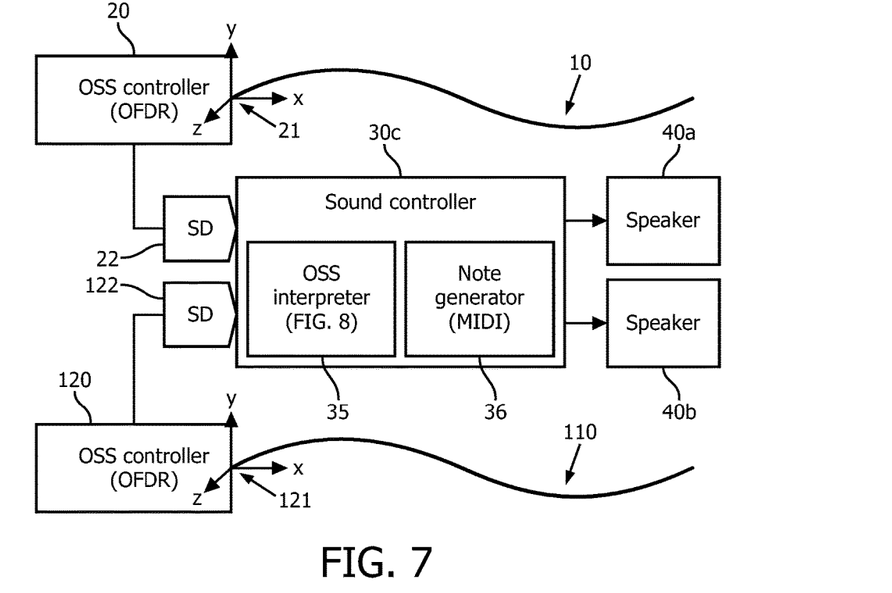
FIG. 7 illustrates a third exemplary embodiment of an OSS sound generation system in accordance with the present invention.

Referring to FIG. 7, an OSS sound generation system of the present invention employs an additional optical shape sensor 110 and an additional OSS controller 120. For this system, OSS controller 120 controls a generation of sensor data 122 by optical shape sensor 110 that is indicative of a shape of optical shape sensor 110. Sensor data 122 is generated relative to a reference coordinate system 121 established by OSS controller 122 and is communicated to a sound controller 30c in a data stream of coordinate points associated with the sensors of optical shape sensor 110.

Figure 8:
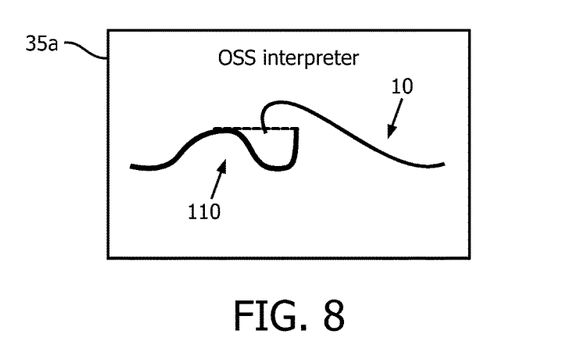
FIG. 8 illustrates a fifth exemplary embodiment of an OSS interpreter in accordance with the present invention.

Based on sensor data 22 and 122 and a calculated registration or known positioning of coordinate systems 21 and 121, an OSS interpreter 35 determines a proximity of optical shapes sensors 10 and 110, and note generator 36 generates a musical note when the optical shapes sensors 10 and 110 are within an undesirable proximity of each other. For example, as shown in FIG. 8, an OSS interpreter 35a determines if a distal tip of optical shape sensor 10 is within proximity of optical shape sensor 110 or vice-versa. If so, note generator 36 generates a sound indicating the optical shape sensors 10 and 110 are to close.

Referring to FIGS. 1-8, those having ordinary skill in the art will appreciate numerous benefits of the present invention including, but not limited to, a generation of sounds mapped to the stimuli measurements and/or location of the optical shape sensor whereby a user of the optical shape sensor may understand changes in stimuli measurements and/or location of the optical shape sensor without having to rely on a visual interpretation of complex, dynamic, 3D views of the optical shape sensor. While the present invention was primarily described in the context of medical procedures, those having ordinary skill in the art will further appreciate the application of the present invention to non-medical procedures.

Examples of non-medical procedures include, but are not limited to, (1) procedures involving limits to non-registered operational properties of the optical shape sensor (e.g., max curvature, max torque/twist, max temperature or pressure), (2) procedures involving a definition of 'boundary' relative to the optical shape sensor (e.g., a mounting of the optical shape sensor on a vehicle in a wind tunnel) whereby a sound warning may be generated if any part of the optical shape sensor is moved farther away from the vehicle than some pre-determined band or surface, (3) a procedure involving a device holding the optical shape sensor whereby a travel distance of the device is limited (e.g., a limit of no more than 180 degrees on a spherical surface), and (4) a procedure involving the optical shape sensor being used to line the fingers of a bomb detecting glove for sensing a bumpy pattern of a hand-grenade whereby an audible alarm may be generated if the bumpy pattern is detected via a shape of the optical shape sensor.

While various embodiments of the present invention have been illustrated and described, it will be understood by those skilled in the art that the embodiments of the present invention as described herein are illustrative, and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention includes all embodiments falling within the scope of the appended claims.

The invention claimed is:

1. An OSS sound generation system, comprising:
an optical shape sensor;
an OSS controller structurally configured to control a generation by the optical shape sensor of sensor data indicative of at least one stimuli measurement of the optical shape sensor;
at least one audible device; and
a sound controller structurally configured to interpret the sensor data to control a generation by the at least one audible device of at least one sound derived from the at least one stimuli measurement of the optical shape sensor
wherein the at least one sound is indicative of at least one of a motion or a shape change of the optical shape sensor relative to a coordinate system.

2. The OSS sound generation system of claim 1, wherein the at least one sound is further indicative of at least one operational property of the optical shape sensor.

3. The OSS sound generation system of claim 1, wherein the at least one sound is further indicative of any variation in at least one operational property of the optical shape sensor.

4. The OSS sound generation system of claim 1, wherein the at least one sound is further indicative of an operational property of the optical shape sensor relative to at least one of a warning threshold and an operating profile.

5. The OSS sound generation system of claim 1, wherein the at least one sound is further indicative of a location of the optical shape sensor relative to at least one of a registered coordinate system or a geographical area or an object.

6. The OSS sound generation system of claim 1, wherein the sensor data is indicative of at least one stimuli measurement of the optical shape sensor as a whole.

7. The OSS sound generation system of claim 1, wherein the sensor data is indicative of at least one stimuli measurement of the optical shape sensor as divided into segments.

8. The OSS sound generation system of claim 1, wherein the sensor data is indicative of at least one stimuli measurement of a distal tip of the optical shape sensor.

9. The OSS sound generation system of claim 1, wherein the optical shape sensor is attached to one of a tool, instrument, device and equipment.

10. The OSS sound generation system of claim 1, wherein the at least one sound is variable in dependence upon any variation in the sensor data.

11. The OSS sound generation system of claim 1, wherein each audible device is at least one of a speaker or an instrument or a synthesizer.

12. The OSS sound generation system of claim 1, wherein the at least one sound includes a surround sound generated by the at least one audible device.

13. The OSS sound generation system of claim 1, wherein the sound controller includes:
a OSS interpreter structurally configured to interpret the sensor data generated by the optical shape sensor; and
a note generator structurally to generate at least one note based on the interpretation of the sensor data and to communicate the at least one note to the at least one audible device.

14. An OSS sound generation system, comprising:
an optical shape sensor;
an OSS controller structurally configured to control a generation by the optical shape sensor of sensor data indicative of at least one stimuli measurement of the optical shape sensor;
at least one audible device; and
a sound controller structurally configured to interpret the sensor data to control a generation by the at least one audible device of at least one sound derived from the at least one stimuli measurement of the optical shape sensor,
wherein the at least one sound is indicative of at least one of a motion or a shape change of the optical shape sensor relative to a coordinate system, and,
wherein at least one of an intensity or a pitch or a tone of each sound is associated with any variation of at least one of the motion, the shape change and an operational property of the optical shape sensor.

15. An OSS sound generation system, comprising:
an optical shape sensor;
an OSS controller structurally configured to control a generation by the optical shape sensor of sensor data indicative of at least one stimuli measurement of the optical shape sensor;
at least one audible device; and
a sound controller structurally configured to interpret the sensor data to control a generation by the at least one audible device of at least one sound derived from the at least one stimuli measurement of the optical shape sensor,
wherein the at least one sound is indicative of at least one of a motion or a shape change of the optical shape sensor relative to a coordinate system, and,
wherein at least one of an intensity or a pitch or a tone of each sound is associated with different segments of the optical shape sensor.

* * * * *